United States Patent
Miyoshi

(10) Patent No.: US 10,005,249 B2
(45) Date of Patent: Jun. 26, 2018

(54) METHOD OF MANUFACTURING AN EYEGLASS LENS WITH GRADATION AND EYEGLASS LENS

(71) Applicant: MIYOSHI INDUSTRIAL ENTERPRISE INC., Sabae-shi, Fukui (JP)

(72) Inventor: Kazuyuki Miyoshi, Sabae (JP)

(73) Assignee: MIYOSHI INDUSTRIAL ENTERPRISE INC., Sabae-Shi, Fukui (JP)

(*) Notice: Subject to any disclaimer, the term of this patent is extended or adjusted under 35 U.S.C. 154(b) by 48 days.

(21) Appl. No.: 14/939,317

(22) Filed: Nov. 12, 2015

(65) Prior Publication Data
US 2016/0320637 A1 Nov. 3, 2016

(30) Foreign Application Priority Data
Apr. 28, 2015 (JP) ................. 2015-090940

(51) Int. Cl.
| | |
|---|---|
| *B29D 11/00* | (2006.01) |
| *B29C 45/14* | (2006.01) |
| *G02C 7/10* | (2006.01) |
| *G02C 7/12* | (2006.01) |
| *B29C 45/00* | (2006.01) |

(52) U.S. Cl.
CPC .... *B29D 11/0073* (2013.01); *B29C 45/14688* (2013.01); *B29D 11/00644* (2013.01); *B29D 11/00653* (2013.01); *B29D 11/00923* (2013.01); *G02C 7/102* (2013.01); *G02C 7/105* (2013.01); *G02C 7/12* (2013.01); *B29C 45/0046* (2013.01); *B29C 45/14336* (2013.01); *B29C 45/14811* (2013.01); *B29C 45/14836* (2013.01); *B29C 2045/14713* (2013.01); *B29C 2793/009* (2013.01); *B29C 2793/0027* (2013.01); *B29K 2995/002* (2013.01); *B29K 2995/0034* (2013.01)

(58) Field of Classification Search
CPC .......... B29D 11/0073; B29D 11/00923; B29D 11/00644; B29D 11/00653; B29C 45/14688; B29C 45/14811; G02C 7/105; G02C 7/12; G02C 7/102
See application file for complete search history.

(56) References Cited

U.S. PATENT DOCUMENTS 7,175,785 B2 * 2/2007 Takeda ................. B29C 33/306
264/1.32

FOREIGN PATENT DOCUMENTS

JP 62-34105 * 2/1987

* cited by examiner

*Primary Examiner* — Mathieu Vargot
(74) *Attorney, Agent, or Firm* — Hamre, Schumann, Mueller & Larson, P.C.

(57) ABSTRACT

The method of manufacturing of this invention is capable of providing an eyeglass lens free from uneven coloring or peeling of a colored layer having a gradation pattern.

9 Claims, 5 Drawing Sheets

METHOD OF MANUFACTURING AN EYEGLASS LENS WITH GRADATION AND EYEGLASS LENS

TECHNICAL FIELD

This invention relates to a method of manufacturing. According to this method, a sheet-like coloring material processed into a shape of a certain curvature is prepared. A colored layer is formed on at least one side of the coloring material. The colored layer has a gradation pattern with shading that becomes paler from one edge toward an opposite edge of the side. A thermoplastic resin is injected on the coloring material having the colored layer, thereby producing a certain eyeglass lens.

DESCRIPTION OF THE BACKGROUND ART

To produce a lens with a colored layer, a coloring material is prepared as preliminary preparation for molding of a lens body by processing a film-like or sheet-like material into a shape of a certain outline and a certain curvature. Then, the coloring material is provided with a colored layer having a certain gradation pattern, for example, and is placed in a position in a mold for injection molding, thereby molding the lens body into a certain lens shape.

There has been an example intended to provide a method of manufacturing a polarizing lens that makes it possible to ensure uniformity of a product lens stably by allowing a polarizing film used as the aforementioned coloring material to be placed reliably in a position in a mold and by making a molded lens have uniform density so it is less likely distorted.

The aforementioned example is a method of manufacturing a plastic polarizing lens using a split mold having a mold surface to form a lens curvature. At least a part of the mold surface to which a polarizing film is inserted is configured as a movable part with which a recess can be generated in response to upward and downward movement of the movable part. The polarizing film molded into a shape corresponding to the movable part is hot pressed into a curved shape conforming to the lens curvature. Then, the movable part is moved downward from a side of the lens curvature to generate the recess. The curved polarizing film is inserted into the recess and the mold is closed. Next, while a molten resin for molding of a lens is poured in a runner continuous with the mold, the molten resin is injected into a cavity of the mold through a gate.

However, if the aforementioned manufacturing method is applied to a piano lens as a thin lens, assuming the thickness of a lens as a finished article is 2 mm and the thickness of a coloring material sheet used in the preliminary preparation is 0.6 mm, the molten resin is to be flown into a gap of 1.4 mm of the mold during injection molding. An injection speed should be increased if a lens is to be molded by injecting the molten resin into such a narrow gap.

In response to increase in the injection speed, the increased speed and the heat of the molten resin act together to melt a coloring material surface while the coloring material surface is pressed with the molten resin. This moves or peels a colored layer provided on this surface by staining, resulting in the problem of uneven coloring or peeling of the colored layer. Examples of such a problem are shown in FIGS. 5A, 5B, and 5C. In these examples, a relationship of an injection direction relative to a shading direction of gradation of a coloring material is determined such that an edge of a darker side or a right or left edge agrees with an upstream side of the injection direction.

Molding a lens with the polarizing film 2 inserted in the recess H of the mold like in Patent Literature causes a problem in that a molding burr pointed toward a convex side of the lens occurs at a peripheral portion of a prototype Lb of the molded lens corresponding to a boundary portion of the movable part 12 of the split mold 1.

SUMMARY OF THE INVENTION

First, this invention is intended to provide an eyeglass lens with gradation according to which uneven coloring or peeling of a colored layer having a gradation pattern, which is provided to a coloring material in a step preceding the molding step, can be minimized in a molding step of injection with a molten resin. Second, this invention is intended to provide an eyeglass lens with gradation free from a molding burr that occurs at a periphery of a molded lens.

To solve above problem this method of manufacturing an eyeglass lens with gradation, comprising: a step of preparing a sheet-like coloring material processed into a shape of a certain outline and a certain curvature; a coloring step of forming a colored layer at least on one side of the coloring material, the colored layer having a gradation pattern with shading that becomes paler from one edge of a side toward an opposite edge of a side; and a molding step of producing a certain eyeglass lens by placing the coloring material with the colored layer in a position on a mold surface and injecting a thermoplastic resin, the eyeglass lens being produced by injection molding with the thermoplastic resin on the coloring material in the molding step while the position of the coloring material on the mold surface is determined such that an edge of a paler side of the colored layer on the coloring material agrees with an upstream side of a direction where the resin is injected.

The above colored layer is formed of a product provided by staining. And above eyeglass lens is manufactured as a thin lens or a piano lens. And above coloring material is configured as a polarizing material or a photochromic material.

Above mold used in the molding step has a concave mold corresponding to a convex side of the coloring material and having a storage concave part for positioning of the coloring material, the storage concave part being substantially the same in depth as the coloring material, the storage concave part of the mold has a first mold of an area smaller than the area of the convex side of the coloring material and a second mold arranged on an outer circumference of the first mold, the second mold has a step part formed so as to correspond to at least an outer peripheral part of the coloring material, the step being substantially the same in depth as the coloring material, and the storage concave part viewed in its entirety is formed of an entire concave shape formed in the second mold and the step of the second mold arranged on the outer circumference of the first mold, the outer peripheral part of the coloring material is manufactured with the injection molding proceeding on the step of the second mold.

Above eyeglass lens with gradation is the lens being manufactured by one of above method.

ADVANTAGEOUS EFFECTS OF INVENTION

According to a method of manufacturing an eyeglass lens with gradation of this invention, uneven coloring or peeling of a colored layer having a gradation pattern can be minimized during injection molding in a molding step of injection with a molten resin that is provided to a coloring material in a step preceding the molding step. This method is also capable of manufacturing an eyeglass lens with gradation free from a molding burr that occurs at a periphery of a molded lens.

BRIEF DESCRIPTION OF DRAWINGS

FIG. 5A is an explanatory view of an example where an edge of a darker side agrees with an upstream side.

DESCRIPTION OF EMBODIMENTS

An embodiment of a method of manufacturing an eyeglass lens with gradation according to this invention is described below based on the drawings.

Figure 1A:
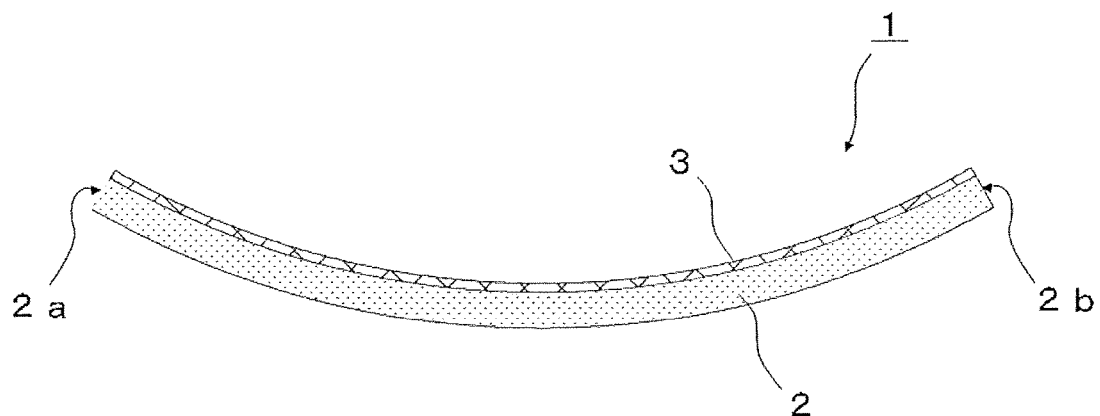
FIGS. 1A and 1B are a sectional view and a front view showing the sheet-like coloring material used in a method of manufacturing an eyeglass lens with gradation of this invention.
Figure 1B:
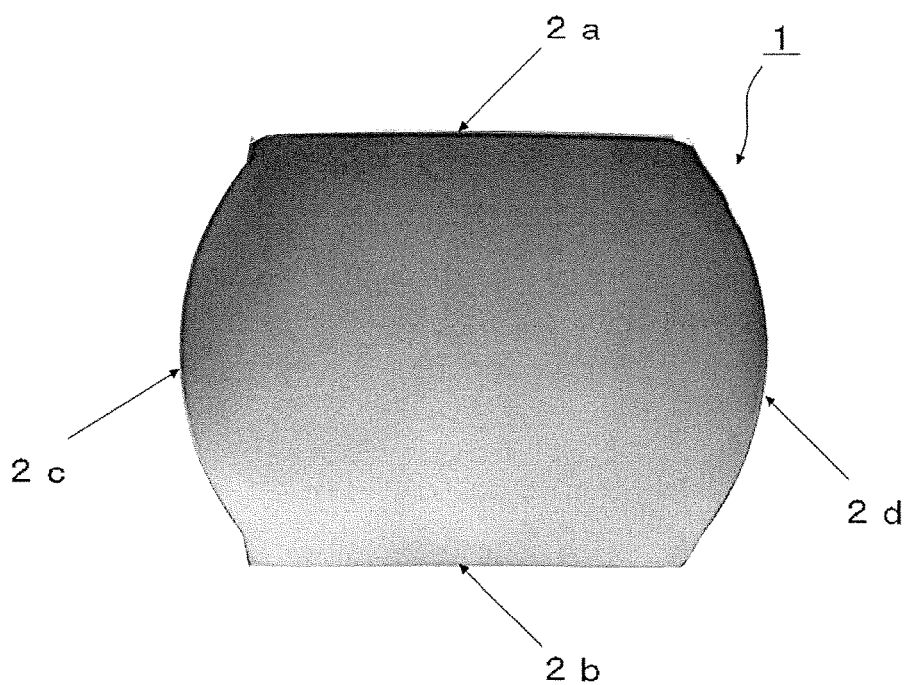

The description starts based on FIGS. 1A and 1B. Referring to FIG. 1A, 1 shows a coloring material prepared as preliminary preparation for molding of a lens body by processing a film-like or sheet-like material into a shape of a certain outline and a certain curvature. A colored layer 3 having a gradation pattern is provided to a sheet-like material 2 processed into the shape of the certain outline and the certain curvature. The sheet-like material 2 is made of a generally used material such as polycarbonate, polyamide, polyethylene terephthalate, or triacetate. While schematically shown in the sectional view of FIG. 1A, the colored layer 3 is actually formed into a gradation pattern that becomes paler from one edge 2a toward an opposite edge 2b of the material. Here, the sheet-like material 2 is colored by staining of immersing the sheet-like material 2 processed into the shape of the certain outline and the certain curvature in a stain solution. While opposite sides of the sheet-like material 2 may be colored in some cases, the coloring mentioned herein is performed on at least one of the sides to provide the colored layer 3 on only the concave side. As shown in FIG. 1B, a left edge and a right edge relative to the edge 2a of a darker side and the edge 2b of a paler side are identified as 2c and 2d respectively.

Figure 2A:
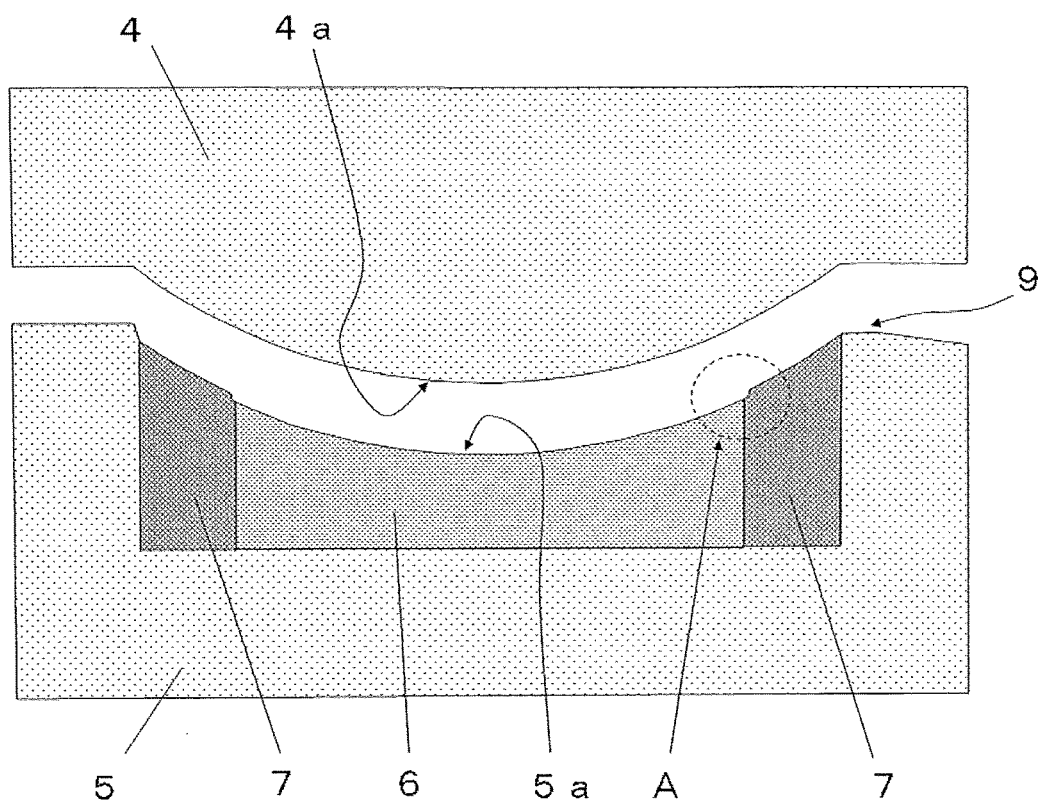
FIGS. 2A and 2B are a sectional view and a partially enlarged sectional view respectively showing the mold used in the method of manufacturing of this invention.
Figure 2B:
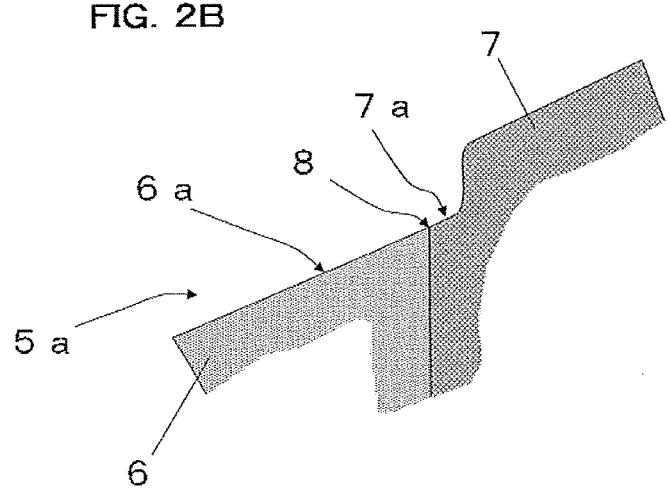

FIGS. 2A and 2B shows a mold used in this invention. FIG. 2A shows a state where an upper mold and a lower mold are separated. FIG. 2B is a partially enlarged sectional view. Referring to FIG. 2A, 4 shows the upper mold having a lower side with a convex part 4a to form a concave side of a molded lens. Further, 5 shows the lower mold to become a concave mold corresponding to a convex side of the coloring material 1. The lower mold 5 is provided with a storage concave part 5a for positioning of the coloring material 1. The storage concave part 5a is substantially the same in depth as the coloring material 1. To form the storage concave part 5a, the lower mold 5 has a first mold 6 of an area smaller than that of the convex side of the coloring material 1 and a second mold 7 arranged on an outer circumference of the first mold 6.

The first mold 6 has an upper side 6a formed into a concave side with a curved surface of a curvature substantially the same as the certain curvature of the coloring material 1. As viewed in its entirety, the upper side 6a has an area smaller than that of the coloring material 1. An outer peripheral part of the coloring material 1 is configured to face a step 7a formed in the second mold 7. Specifically, the storage concave part 5a of the lower mold 5 for positioning and storage of the coloring material 1 is formed of the upper side 6a of the first mold 6 and the step 7a of the second mold 7 formed on an outer peripheral part of the first mold 6. Referring to FIG. 2B showing the cross section of an area A of FIG. 2A in an enlarged manner, the upper side 6a of the first mold 6 and the step 7a of the second mold 7 are flush with each other in a contact part 8 between the upper side 6a and the step 7a. In this mold, 9 shows a gate through which a molten resin is poured while the upper and lower molds 4 and 5 are joined.

For manufacture of an eyeglass lens, the coloring material 1 with the colored layer having the aforementioned gradation pattern is placed in a position in the storage concave part 5a and injection molding is performed with the molds 4 and 5 having the aforementioned formations. The description proceeds based on FIGS. 3A and 3B.

Figure 3A:
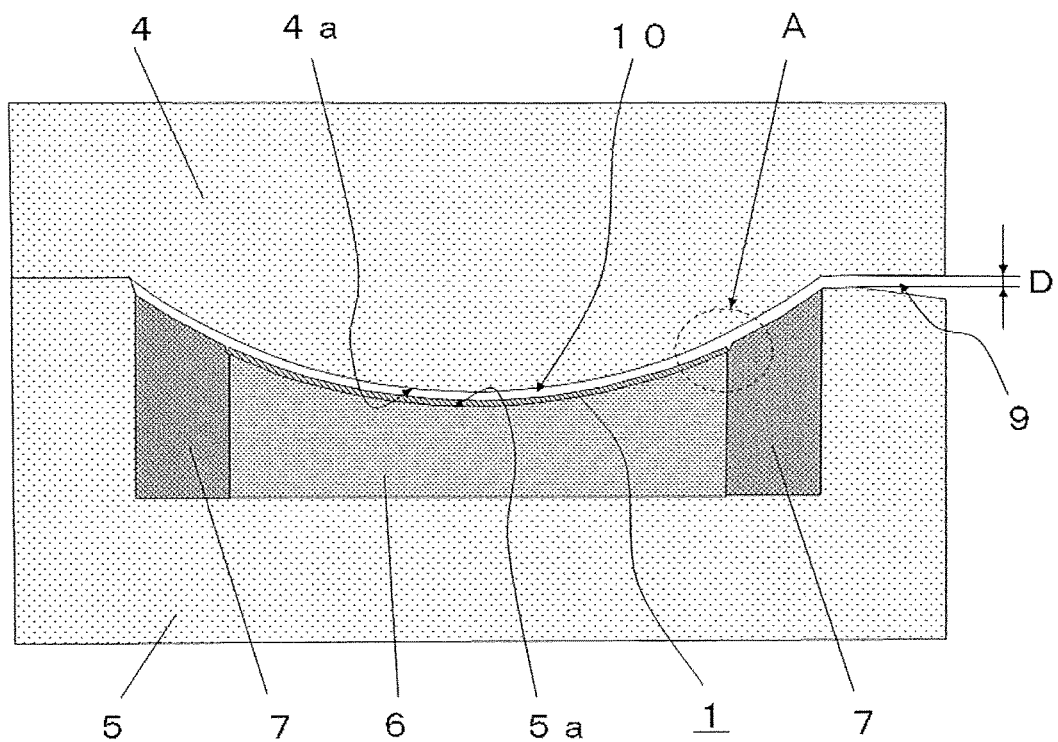
FIGS. 3A and 3B are a sectional view and a partially enlarged sectional view respectively showing the state where the coloring material is placed in a position in the mold.
Figure 3B:
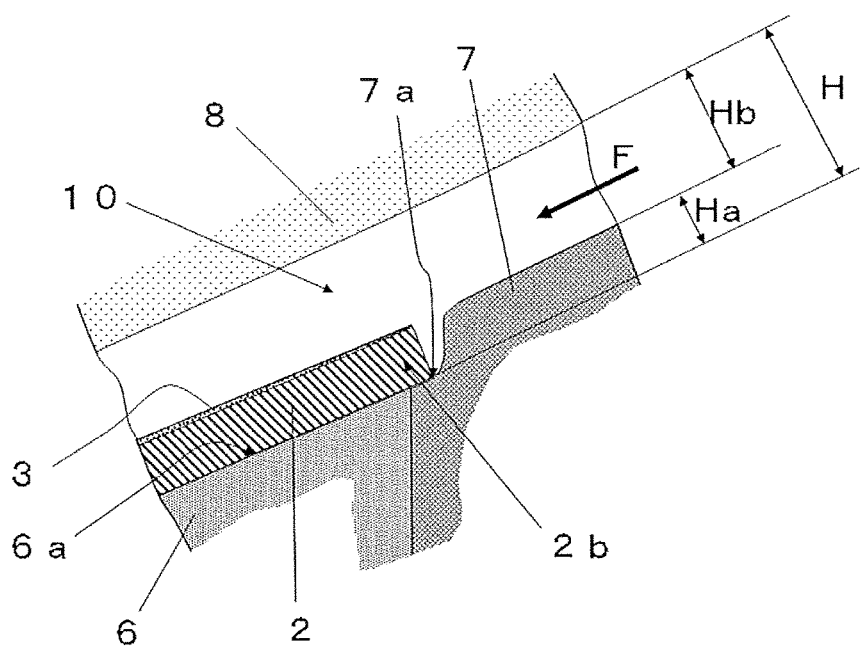

FIGS. 3A and 3B show a state where the coloring material 1 is placed in a position in the storage concave part 5a and the upper and lower molds 4 and 5 are joined. Molding space 10 is formed between the coloring material 1 and the convex part 4a of the upper mold 4 where a lens body is to be formed by filling with a molding resin. A molten resin is injected in an injection direction F through a molding gate 9 into the molding space 10. Specifically, in the state of FIGS. 3A and 3B, the molten resin is to be injected from the right side. During the injection, the coloring material 1 is placed in a position determined such that a side to which the gate 9 belongs and that corresponds to an upstream side of the injection direction F where the molten resin is to be poured agrees with the edge 2b side of a paler side of the aforementioned colored layer with gradation provided to the coloring material 1. As shown in the enlarged sectional view of FIG. 3B, the coloring material 1 is placed in a position determined such that the edge 2b side agrees with an upstream side of the injection direction F and that the lower side of the sheet material 2 at the edge 2b side completely covers the contact part 8 between the upper side 6a of the first mold 6 and the step 7a of the second mold 7. This enables molding while preventing a molding burr to occur even in a slight gap of the contact part 8.

Referring to FIGS. 3A and 3B, assuming that an eyeglass lens to be molded is a piano lens, the thickness H of the finished lens is 2 mm and the thickness Ha of a coloring material sheet is 0.6 mm, a gap Hb for injection molding becomes 1.4 mm. A molten resin is to be flown into the gap Hb. A gap D of the gate 9 set in this case is 1.3 mm to achieve injection molding at a high speed. The resin used herein is substantially the same as a material for a concave side of the coloring material sheet. Examples of this resin include polycarbonate, transparent nylon, polyester modified products, and cyclic olefin resin.

Figure 4A:
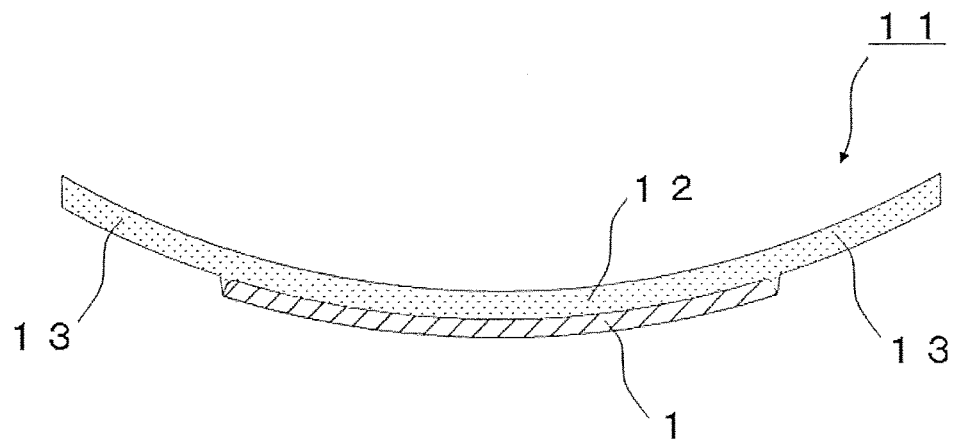
FIGS. 4A and 4B are a sectional view and a front view respectively showing the eyeglass lens with gradation manufactured by the method of manufacturing of this invention.
Figure 4B:
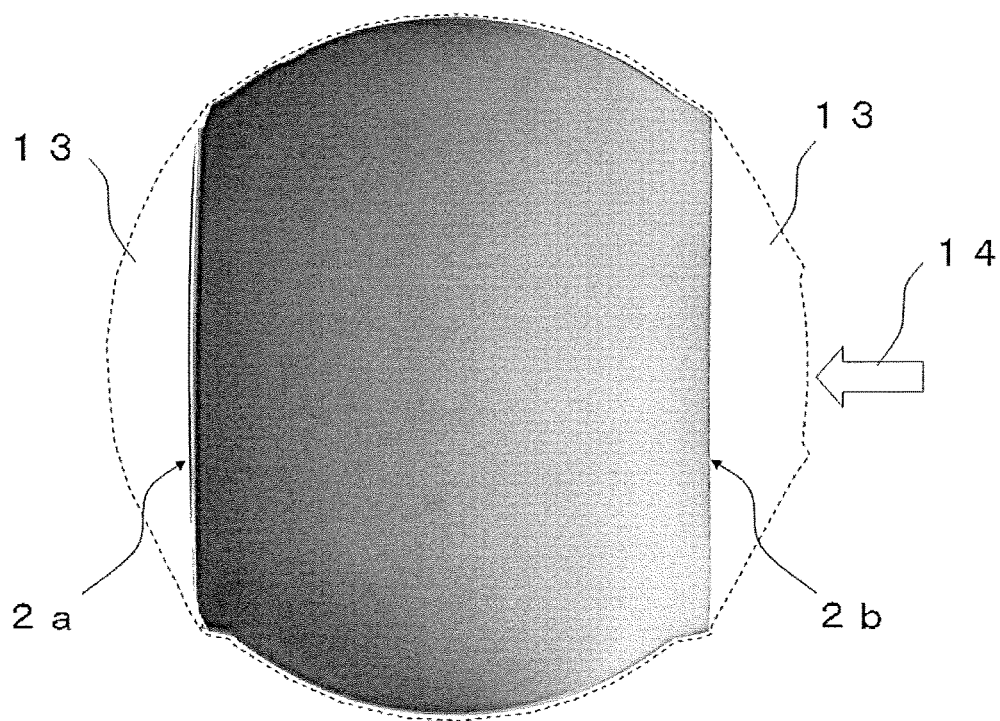

FIGS. 4A and 4B shows a lens molded by injection molding performed under the aforementioned conditions. FIGS. 4A and 4B are a sectional view and a front view respectively showing a molded eyeglass lens 11 in a state where the coloring material 1 is molded integrally with a molded part 12 forming a lens body. A molded part 13 formed integrally around the coloring material 1 is to be finally cut for use. An arrow shown in FIG. 4B indicates an injection direction. This arrow shows that injection molding was performed with the edge 2b of a paler side of the colored layer having the gradation pattern provided to the coloring material 1 agreeing with an upstream side of the injection direction. Performing injection molding with the edge 2b of a paler side of the colored layer having the gradation pattern provided to the coloring material 1 agreeing with an upstream side of an injection direction 14 in this way enables molding while minimizing uneven coloring or peeling of the colored layer 3 having the gradation pattern provided to the sheet material 2 of the coloring material 1 in a step preceding the injection molding.

Figure 5A:
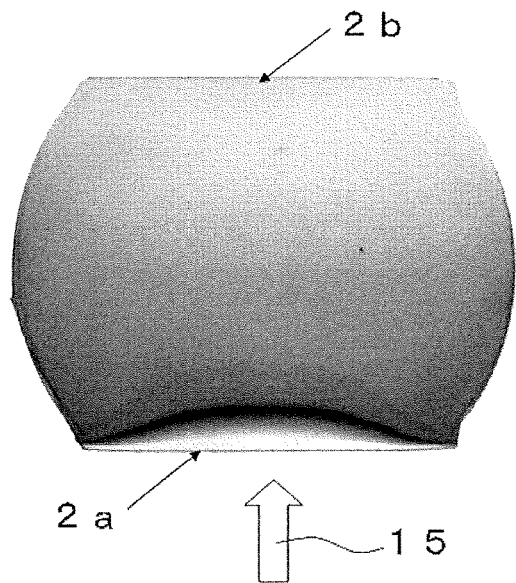
FIGS. 5A, SB, and SC are explanatory views showing an example where uneven coloring occurs depending on an injection direction relative to a shading direction of a colored layer having a gradation pattern provided to the sheet-like coloring material.
Figure 5B:
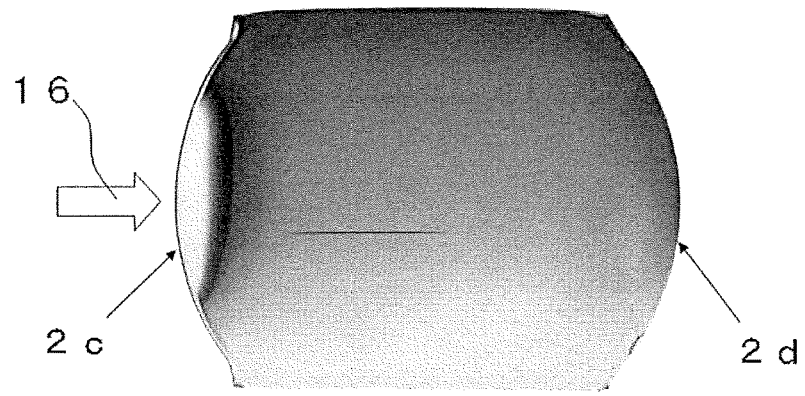
FIG. 5B is an explanatory view of an example where a left edge side agrees with an upstream side.
Figure 5C:
FIG. 5C is an explanatory view of an example where a right edge side agrees with an upstream side.

The following describes influence on uneven coloring or the like to be caused during injection molding. As shown in FIGS. 5A, 5B, and 5C referred to previously in the section Technical Problem, in each of the case of injection molding of FIG. 5A with the edge 2a of a darker side agreeing with an upstream side of an injection direction 15, injection molding of FIG. 5B with the left edge 2c side agreeing with an upstream side of an injection direction 16, and injection molding of FIG. 5C with the right edge 2d side agreeing with an upstream side of an injection direction 17, a colored layer formed by staining on a surface in a preceding step is moved or peeled. This results in the problem of uneven coloring or peeling of the colored layer as shown in FIGS. 5A, SB, and SC. By contrast, taking into consideration a direction of injection on a colored layer having a gradation pattern as in this invention enables molding while minimizing uneven coloring or peeling of the colored layer 3 having the gradation pattern provided to the sheet material 2 of the coloring material 1 in a preceding step.

The invention claimed is:

1. A method of manufacturing an eyeglass lens with gradation, comprising:
    a step of preparing a sheet-like coloring material processed into a shape of a certain outline and a certain curvature;
    a coloring step of forming a colored layer at least on one side of the coloring material, the colored layer having a gradation pattern with shading that becomes paler from one edge of a side toward an opposite edge of the side; and
    a molding step of placing the coloring material with the colored layer in a position on a mold surface, and injecting a thermoplastic resin on the coloring material while the position of the coloring material on the mold surface is such that an edge of a paler side of the colored layer on the coloring material is towards an upstream side of a direction from where the thermoplastic resin is injected,
    wherein a mold used in the molding step has a storage concave part for positioning the coloring material,
    the storage concave part of the mold has a first mold of an area smaller than the area of the convex side of the coloring material, and a second mold arranged on an outer circumference of the first mold, and
    the second mold has a step part formed so as to correspond to at least an outer peripheral part of the coloring material, the step part being substantially the same in depth as the coloring material.

2. The method of manufacturing an eyeglass lens with gradation according to claim 1, wherein the colored layer is formed of a product provided by staining.

3. The method of manufacturing an eyeglass lens with gradation according to claim 1, wherein the eyeglass lens is manufactured as a thin lens or a plano lens.

4. The method of manufacturing an eyeglass lens with gradation according to claim 1, wherein the coloring material is configured as a polarizing material or a photochromic material.

5. The method of manufacturing an eyeglass lens with gradation according to claim 2, wherein the eyeglass lens is manufactured as a thin lens or a plano lens.

6. The method of manufacturing an eyeglass lens with gradation according to claim 2, wherein the coloring material is configured as a polarizing material or a photochromic material.

7. The method of manufacturing an eyeglass lens with gradation according to claim 3, wherein the coloring material is configured as a polarizing material or a photochromic material.

8. The method of manufacturing an eyeglass lens with gradation according to claim 5, wherein the coloring material is configured as a polarizing material or a photochromic material.

9. A method of manufacturing an eyeglass lens with gradation according to claim 1, wherein
    the mold used in the molding step has a concave mold corresponding to a convex side of the coloring material,
    the storage concave part being substantially the same in depth as the coloring material, and
    the storage concave part viewed in its entirety is formed of an entire concave shape formed in the first mold and the step of the second mold arranged on the outer circumference of the first mold, the outer peripheral part of the coloring material is manufactured with the injection molding proceeding on the step of the second mold.

* * * * *